United States Patent [19]
Nelson

[11] Patent Number: 6,092,912
[45] Date of Patent: Jul. 25, 2000

[54] PORTABLE, SMALL, LIGHT-WEIGHT RADIANT AND/OR ELECTRICAL POWER GENERATING SOURCES

[75] Inventor: Robert E. Nelson, Weston, Mass.

[73] Assignee: Quantum Group, Inc., San Diego, Calif.

[21] Appl. No.: 09/173,796

[22] Filed: Oct. 16, 1998

Related U.S. Application Data

[60] Provisional application No. 60/062,296, Oct. 17, 1997.

[51] Int. Cl.[7] ........................................... F21V 33/00
[52] U.S. Cl. ........................... 362/253; 136/253; 362/159
[58] Field of Search ..................... 136/205, 213, 136/214, 215, 253; 362/159, 166, 192, 253; 126/255, 258; 431/100

[56] References Cited

U.S. PATENT DOCUMENTS

| | | | |
|---|---|---|---|
| 3,096,027 | 7/1963 | Atkins et al. | 362/159 |
| 4,584,426 | 4/1986 | Nelson | 136/253 |
| 5,016,611 | 5/1991 | Lai | 126/258 |

*Primary Examiner*—Stephen Husar
*Attorney, Agent, or Firm*—Christie Parker & Hale, LLP

[57] ABSTRACT

Portable, small, and light-weight radiant and/or electrical power generating sources, constructed according to the principles of this invention, comprise an air/fuel delivery device that houses a fuel canister of pressurized hydrocarbon fuel therein. The fuel canister includes a check valve that is selectively activated to release the pressurized hydrocarbon fuel to a pressure regulator and then through a venturi disposed within the delivery device. The delivery device includes an ignitor that is also activated when the fuel is released. A radiant head is attached to the delivery device and includes a luminous mantle in gas flow communication with the venturi and formed from a fibrous rare earth oxide. The head includes a lens and reflector system adjacent the mantle. Alternatively, or in addition to the radiant head, a thermophotovoltaic head can be attached to the delivery system. The thermophotovoltaic head also includes a luminous mantle in gas flow communication with the venturi, and a lens and reflector system. The mantle in each head is illuminated by the combustion of an ignited air/fuel mixture. The thermophotovoltaic head includes one or more photovoltaic cells adjacent the lens and reflector system. The radiant head thus produces a desired degree of radiant energy, while the thermophotovoltaic head produces a desired amount of electrical power.

21 Claims, 6 Drawing Sheets

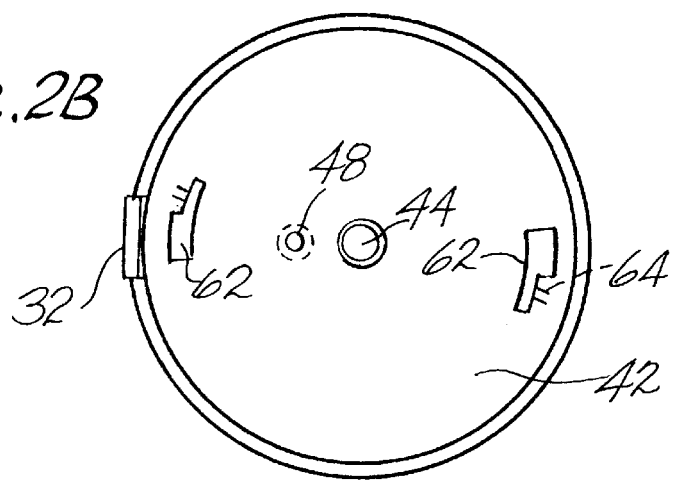
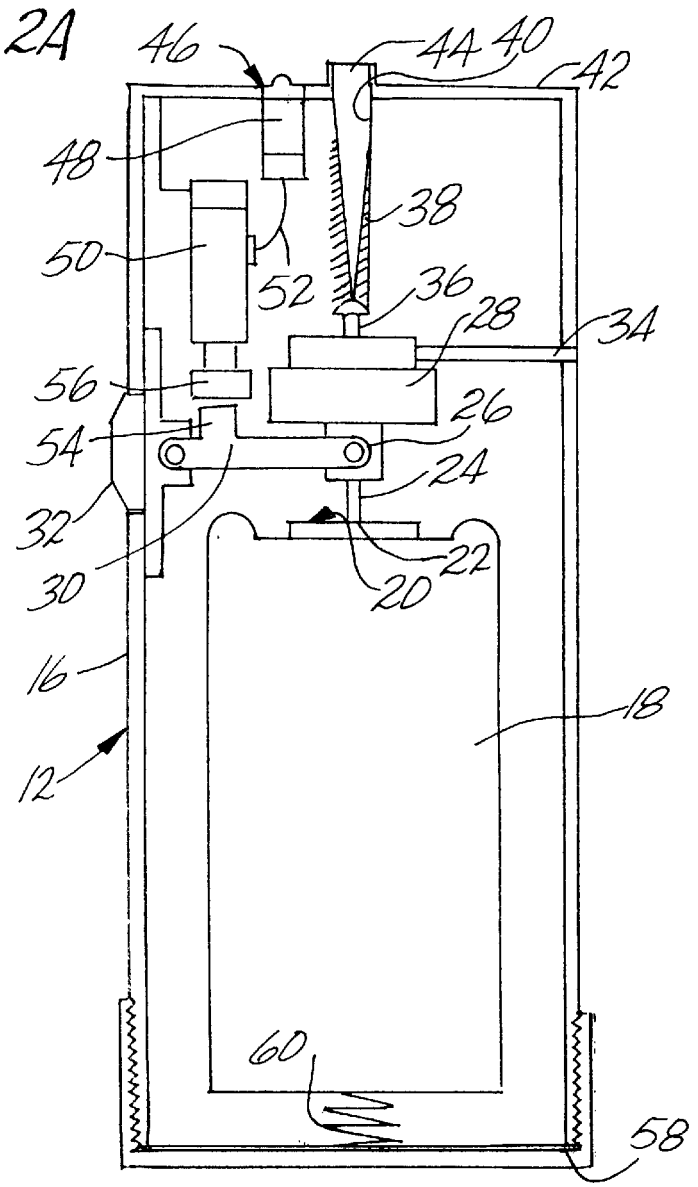

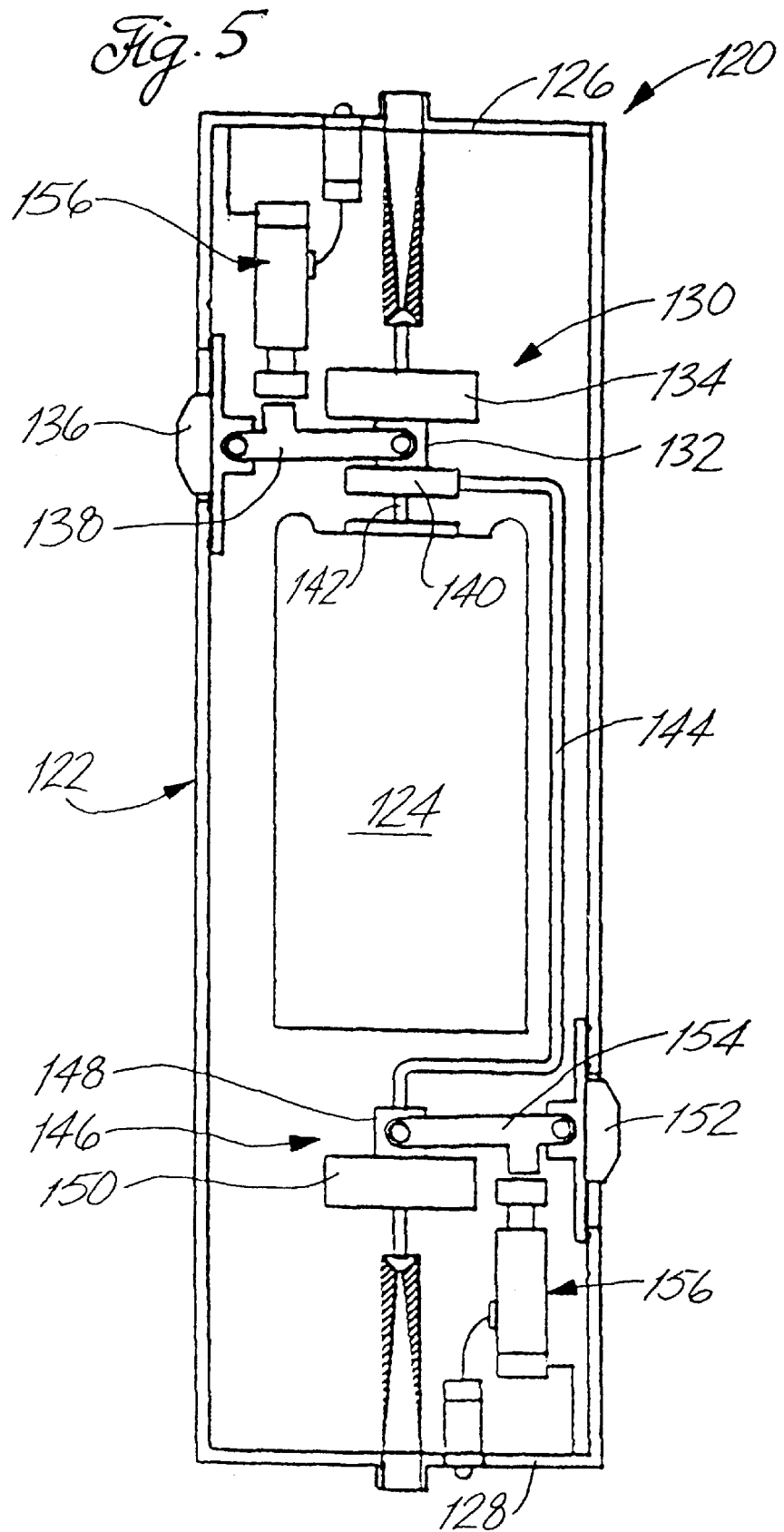

PORTABLE, SMALL, LIGHT-WEIGHT RADIANT AND/OR ELECTRICAL POWER GENERATING SOURCES

This application claims benefit of Provisional Appl. No. 60/062,296 filed Oct. 17, 1997.

FIELD OF THE INVENTION

This invention relates to portable, small light-weight radiant and/or electrical power generating sources and, more particularly, to such sources that utilize a gas mantle which is thermally powered by a stored hydrocarbon fuel.

BACKGROUND OF THE INVENTION

Portable battery-powered radiant sources such as flashlights are well known devices that can be embodied in small and light weight packages. However, such conventional battery-powered devices have a limited service life before needing either replacement or recharging, making them inefficient for particular applications, particularly for applications such as surveillance operations where long radiant source operating life is critical to the success of the operation. In such operation the early failure of the radiant source could result in an unsuccessful operation, or could even put ones life in danger. For a similar reason, conventional portable small, light-weight electrical power generating sources such as batteries are also not well suited for powering accessories that are used in applications calling for a long service life, such as surveillance operations.

It is, therefore, desired that a portable radiant and/or electrical power generating source be developed that have a service life superior to conventional battery-powered radiant and electrical power generating sources. It is desired that such portable radiant and/or electrical power generating sources be packaged in a construction that is small in size and light weight.

SUMMARY OF THE INVENTION

Portable, small, and light-weight radiant and/or electrical power generating sources, constructed according to the principles of this invention, comprise an air/fuel delivery device that is attached to one of or both of a radiant head and/or a electrical power generating head, i.e., a thermophotovoltaic head. The air/fuel delivery device has a housing with a hollow cavity therein. A fuel canister is disposed within the cavity and is adapted to retain a volume of pressurized hydrocarbon fuel therein. The fuel canister includes a check valve to retain the pressurized hydrocarbon fuel therein. The delivery device includes means for activating the check valve disposed within the cavity, and that can be activated to remove the pressurized fuel from the fuel canister. A pressure regulator is disposed within the cavity downstream of the fuel canister, and a venturi is disposed within the cavity downstream of the pressure regulator. The delivery device includes an ignition means disposed within the cavity for igniting the fuel after it has been mixed with air to form a combustible mixture, the ignition means being activated by the activating means.

A radiant head includes a housing that is releasibly attached to an end of the delivery system adjacent the venturi, and that includes a luminous mantle disposed therein formed from a fibrous rare earth oxide material. The mantle is in gas flow communication with the venturi. A lens and reflector system is disposed within the radiant head housing adjacent the mantle. The radiant head housing includes means for removing exhaust gas products therefrom and for receiving secondary combustion air from the outside atmosphere. Upon actuation of the activating means fuel existing the delivery device mixed with combustion air and is ignited by the ignition means near the mantel where the air/fuel mixture is combusted and causes the mantle to be illuminated. Radiant energy provided by the mantle is culminated by the lens and reflector system and is discharged from the radiant head.

Alteratively, a thermophotovoltaic head can be attached to the delivery system. Such thermophotovoltaic head includes a housing that is releasibly attached to an end of the delivery system adjacent the venturi, and that includes a luminous mantle disposed therein formed from a fibrous rare earth oxide material. The mantle is in gas flow communication with the venturi. A lens and reflector system is disposed within the thermophotovoltaic head housing adjacent the mantle. The thermophotovoltaic head housing includes means for removing exhaust gas products therefrom and for receiving secondary combustion air from the outside atmosphere. Upon actuation of the activating means, fuel existing the delivery device mixed with combustion air and is ignited by the ignition means near the mantel where the air/fuel mixture is combusted and causes the mantle to be illuminated. One or more photovoltaic cells are positioned within the thermophotovoltaic head housing adjacent the lens to collect the radiant energy and convert the same to electricity.

The air/fuel delivery device can be configured to accommodate both of the radiant and electrical power generating heads, i.e., provide dual air/fuel delivery, to enable operation of each radiant and electrical power generating head independently from a single fuel canister. In such embodiment, the dual air/fuel delivery device is fitted with a single fuel canister and a fuel distributor is used to provide pressurized fuel upon actuation of separate first and second activating means to independent respective first and second pressure regulators and respective first and second venturis. The first and second venturis are positioned along the delivery device housing near attachment points for the respective radiant head and thermophotovoltaic head. Configured in this manner, independent actuation of each first and second actuating means causes the respective independent operation of the radiant and thermophotovoltaic heads, and desired illumination and/or electrical power generation.

BRIEF DESCRIPTION OF THE DRAWINGS

Portable small, light-weight radiant and/or electrical power generating sources prepared according to principles of this invention will be better understood with reference to the following figures:

FIGS. 2A and 2B are respectively a schematic side cross-sectional view, and a schematic end view, of a single air/fuel delivery system for the portable small light-weight radiant source of FIG. 1;

FIG. 5 is a schematic side cross-sectional view of a dual air/fuel delivery system prepared according to principles of the invention.

DETAILED DESCRIPTION

A portable, small, light-weight, hand-held radiant and/or electrical power generating source comprises, according to principles of the invention, an air/fuel delivery system attached to at least one of a radiant head or a thermophotovoltaic head. The air/fuel delivery system comprises a volume of liquid hydrocarbon fuel, a hydrocarbon fuel pressure regulator, an air:fuel ratio adjustment valve, and an ignition means. The air/fuel delivery system is adapted to provide visible radiation, by attachment with the radiant head, or to provide electrical energy, by attachment with the thermophotovoltaic head. Alternatively, a dual air/fuel delivery system is constructed according to principles of this invention to accommodate attachment with both the radiant head and thermophotovoltaic head to provide both visible radiation and electrical energy.

Radiant sources of this invention have most of the attributes of a common flashlight, however, are realized in a system using a gas mantle which is thermally powered by a stored hydrocarbon fuel. Because of the very high energy density of liquid hydrocarbon fuels (propane, butane, gasoline, diesel fuel, and the like), long operating periods and very light weight systems are possible for these radiant systems when compared with conventional battery-powered flashlights. When used with surveillance gear such as high performance and low cost silicon charge-coupled-device (CCD) imagers, these radiant sources can be especially effective if the radiant output is concentrated in a narrow wavelength band near 1 $\mu$m where silicon has the highest responsivity.

Figure 1:
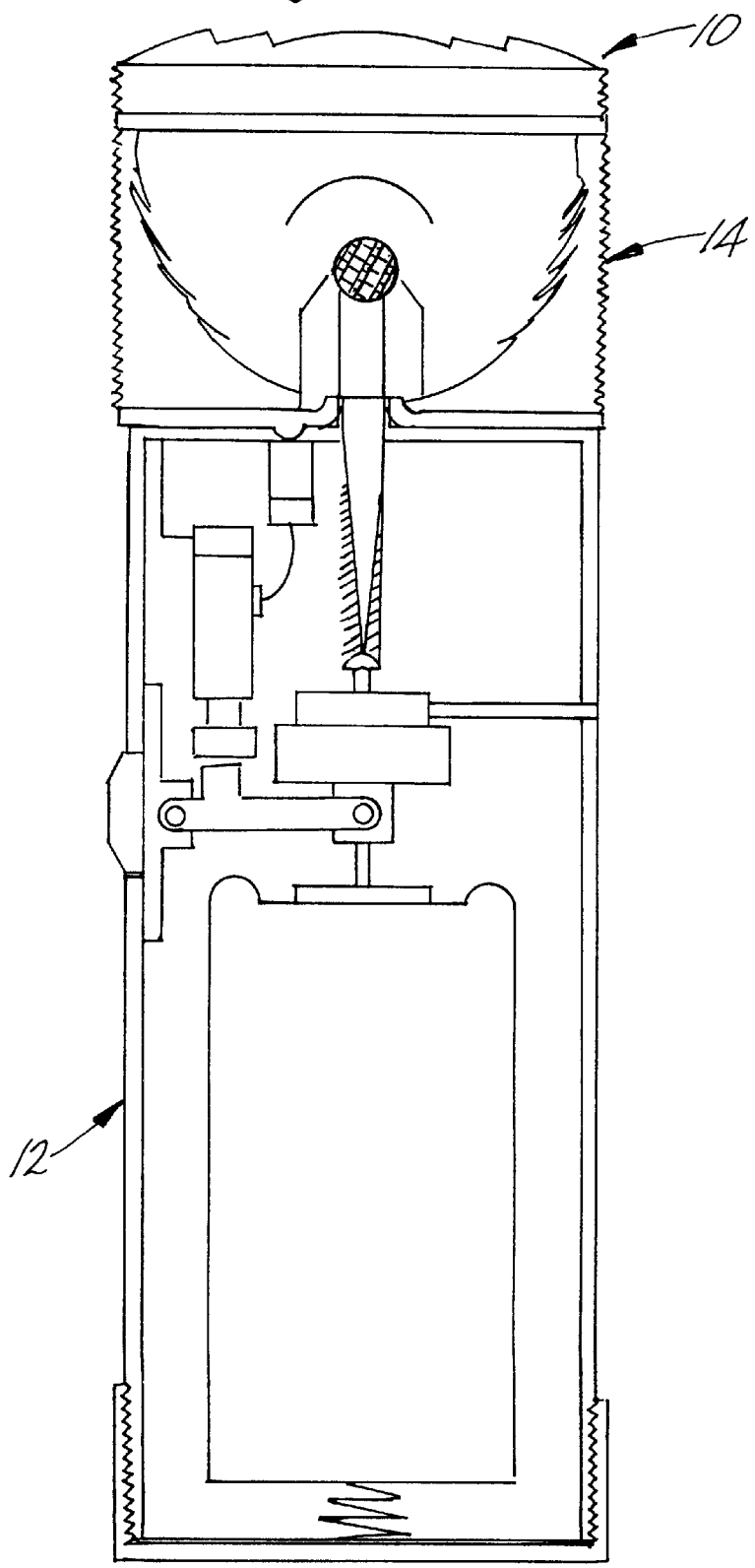
FIG. 1 is a schematic side cross-sectional view of a portable small light-weight radiant source constructed according to principles of this invention.

Referring to FIG. 1 a portable, small light-weight radiant source 10, constructed according to principles of this invention, comprises an air/fuel delivery device 12 attached to a radiant head 14. The device 10 is preferably sized to be hand held. However, can be sized differently depending on the particular application, e.g., the device can be configured to permit attachment with another structure by conventional means. FIGS. 2A and 2B illustrate the air/fuel delivery device 12 that is configured to deliver a single ignited stream of the combustible mixture.

Referring to FIG. 2A, the air/fuel delivery device 12 comprises a housing 16 that is formed from a suitable structural material to form a robust outer package. An example housing material is one formed from aluminum because of its combined properties of high strength and light weight. A preferred housing material is one formed thin-walled aluminum that has been oxide passivated and dyed black or other suitable color. The combustible hydrocarbon fuel is stored in a fuel canister 18 that is constructed from a structural material having sufficient strength to withstand the vapor pressure of fuels with a boiling point much lower than the operational temperature. In an example embodiment, suitable fuel canisters are formed from impact extruded aluminum cans, such as those that have been developed and used for containing consumer types of aerosol products. These open-ended cylinders have rolled tops to accommodate top-closing valve assemblies in lids that are crimped in place with a gasket for long term hermeticity. The wall thickness of the fuel canister can vary in size depending on fuel type and what is needed to safely accommodate the selected type of fuel.

Suitable hydrocarbon fuels that can be used for air/fuel delivery with the invention include butane, isobutane, propane, and combinations or blends of these gases, and other such hydrocarbon fuels, that are highly volatility, low cost, and clean burning. Propane is know for its high volatility, low cost and clean burning properties, having a boiling point at atmospheric pressure of approximately −41.1° C., which ensures convenient volatilization and easy ignition down to temperatures as low as −40° C. Butane and isobutane are also volatile insofar as their respective boiling points at atmospheric pressure are −0.5° C. and −11.7° C.

The type of fuel that is selected will affect the type of material that is chosen to form the fuel canister 18. There are a number of consumer products or appliances that operate at room temperature and are powered by butane. The include portable curling irons, soldering irons, and cigarette lighters. All of these products have fuel reservoirs fabricated from plastics such as polycarbonate and nylons. Since butane has a relatively low equilibrium vapor pressure at operating temperature (15 to 30 psig at room temperature and 40 to 65 psig at 40° C.), a plastic fuel canister is acceptable when butane is the selected fuel. Propane, however, has a higher equilibrium vapor pressure than butane. Propane's equilibrium vapor pressure is above 100 psig at room temperature and requires more robust containment than that afforded by molded plastic containers.

Propane is commonly stored in steel or aluminum cylinders in a number of commercial sizes. Containers storing approximately one pound of propane are disposable. Containers capable of storing 10 to 20 pounds of propane are refillable and typically are used in outdoor barbeque equipment, as well as many other applications. When propane is the selected fuel the fuel canister is preferably made from the thin-wall aluminum construction described above having a wall thickness adequate to store the propane fuel at high storage temperatures, e.g., 50° C. An additional advantage of using a fuel canister made from aluminum is that it can be recycled, rather than thrown away, after use.

The fuel canister can be sized according to particular need or application to contain a particular volume of fuel. For example, fuel canisters can be sized to store 15 grams of propane (225 watt hr thermal energy) to 70 grams (1,000 watt hr thermal energy) to meet the demands of different applications. In a preferred embodiment, propane is selected as the fuel and is stored in such fuel canister. In an example embodiment, the fuel canister is sized to contain approximately 25 grams of propane.

The fuel exists the fuel canister 18 through a valve 20 mounted within a fuel canister lid 20. The valve 20 is in the form of a spring-loaded normally-closed check valve. The check valve is opened by pressing a tube member 24 into the check valve, which causes the valve to allow the passage of fuel thereby and through the tube member 24.

The canister/lid/valve combinations come in many sizes and shapes. Example embodiments are sized as described above to store from 20 to 70 grams of fuel yet fit within the handle of the flashlight-like design. All gasketing material is selected for its stability in propane or butane environments. Viton™ is an acceptable gasket material. Clean fuel, furthermore, that contains a minimum amount of impurities or contaminants like high molecular weight paraffins must be used to prevent clogging of the fuel passages or orifices during long term operation. A porous pouch (not shown) disposed within the fuel canister containing activated charcoal is beneficial in trapping some of the aforementioned contaminants.

Still referring to FIG. 2A, a fuel delivery on/off switch 26 is positioned over an outlet of the fuel canister tuber member 26 and includes a fuel delivery check valve. The fuel delivery check valve is oriented so that about 5 psi of pressure is required to inject fuel vapor from the fuel canister into the pressure regulator. This check valve prevents the introduction of significant amounts of liquid fuel directly into the pressure regulator. With an operational check valve in place, fuel delivery is stabilized and independent of device orientation. The fuel delivery check valve is positioned between the on/off switch 26 and a fuel pressure regulator 28 disposed adjacent the on/off switch 26.

The fuel pressure regulator 28 is designed to control the pressure of fuel that is dispensed from the fuel canister. The fuel delivery on/off switch and fuel pressure regulator are each mounted within the housing 16 so that they do not become dislodged during fuel canister replacement. The fuel delivery on/off switch 26 is designed to imposed an axially directed pressure force onto the fuel canister tube member 24, to thereby initiate fuel delivery from the canister. To accomplish such movement, a lever 30 is connected at one of its ends to the fuel delivery on/off switch 26, and is connected at an opposite one of its ends to a housing on/off switch 32 that extends outwardly from the housing. The lever 30 is attached within the housing so that the axial movement of the housing on/off switch 32 in one direction causes the fuel delivery on/off switch 26 to be moved axially in an opposite direction, i.e., to produce a pivoting movement between the on/off switches.

An adjustment valve or adjustable orifice 34 is disposed within the housing 16 and is positioned adjacent the pressure regulator 28. The adjustment valve 34 is designed to permit a user to adjust the air:fuel ratio of the combustion mixture to a desired or optimum stoichiometry. The air to fuel rate is controlled by the fuel vapor pressure behind the adjustment valve or adjustable orifice 34. In an example embodiment, the adjustable valve is an orifice formed from a drilled watch jewel having an orifice diameter ranging from 40 to 500 $\mu$m. These watch jewels are press-fitted into brass stems attached to a pressure regulator. Fuel vapor pressures ranging from 2 to 10 psi are typically employed. The fuel vapor pressure is controlled by a single stage diaphragm type of pressure regulator which makes the fuel rate essentially independent of temperature, product orientation, etc. The fuel rate, which is varied by adjusting the vapor pressure behind the orifice, depends on the radiant output or electrical power required for the particular application.

A hollow stem 36 projects outwardly from the adjustable valve or adjustable orifice 34 and serves to dispense the fuel to a downstream venturi 38. The hollow stem 36 and venturi 38 are fixed within the housing 16 and, in an example embodiment, are aligned along the housing central axis. The fuel is delivered from the adjustable valve or adjustable orifice 36 through the hollow stem 36 and into a throat 40 of the venturi 38 at a controlled rate as a high velocity stream. The high velocity gas stream entrains air so that an air/fuel mixture emerges from the expanded end of the venturi. The fuel rate in the high velocity stream is controlled by the orifice diameter and the fuel vapor pressure behind upstream of the orifice. The velocity of the vapor from the orifice must be sufficient to entrain the required air, and the length of the venturi and possible further extensions must be sufficient to mix the fuel and air.

For low power systems, the orifice diameter is small, and care must be taken to ensure that the orifice is coaxial with the venturi. For a fuel rate of 10 watts (thermal), an orifice diameter of about 40 $\mu$m is typical. Orifice diameters increase with fuel rate. The pressure regulator can be designed to stabilize the system performance against ambient temperature fluctuations. For example, the pressure regulator can be designed having a negative slope so that the fuel rate (pressure) is slightly lower when the input pressure is high (high ambient temperature). AT low input pressures (low ambient temperature), the pressure is slightly higher to yield a slightly higher fuel delivery. Configured in this manner the air/fuel delivery device adopts a basic atmospheric burner approach that is inherently simple, light weigh and small in size.

The venturi throat 40 projects axially through the housing 16 from the stem to a partially-closed end 42 of the housing 16. A venturi outlet 44 extends through the partially-closed end 42 and serves to dispense the fuel passing through the venturi throat from the housing 16 for subsequent combustion.

An ignition means 46 is disposed within the housing 16 for igniting or raising the combustible air/fuel mixture exiting the venturi outlet 44 to/above its ignition temperature. In an example embodiment, the ignition means 46 is in the form of a piezoelectric ignitor. A piezoelectric element 48 is positioned within the housing partially-closed end 42 adjacent the venturi outlet 44, and is connected to a impact hammer element 50 by electrical wire 52. The impact hammer element 50 is positioned within the housing 16 adjacent the housing on/off switch 32 so that placement of the housing on/off switch 32 to the on position causes a projecting section 54 of the lever 30 to impact a trigger 56 of the hammer element 50, thereby activating the piezoelectric element.

A removable end cap 58 is attached to an end of the housing 16 opposite the partially-closed end 42 by conventional means, e.g., is threadably attached. The end cap is removable to facilitate removal and replacement of the fuel canister after it has been emptied or spend. A spring 60 is attached to a bottom portion of the end cap 58, and is interposed between the end cap 58 and the fuel canister to urge the fuel canister into engagement with the fuel delivery on/off switch and check valve.

FIG. 2B illustrates the partially-closed end 44 of the housing 16, and placement of the venturi outlet 44 and piezoelectric element 48 disposed therein. The partially-closed end 44 also includes an attachment means for accommodating attachment with a radiant head or a thermophotovoltaic head. In an example embodiment, the attachment means is in the form of a pair of openings 62 disposed through the partially-closed end 44. The openings 62 are positioned 180 degrees apart from one another and are configured to accommodate placement of head legs therethrough. A detent 64 is positioned within the housing along an inside partially-closed end surface to provide a snap fit with the head legs after positioned through the openings and rotated a desired amount therein, thereby providing a releasible attachment between the air/fuel delivery device and the head.

Figure 3:
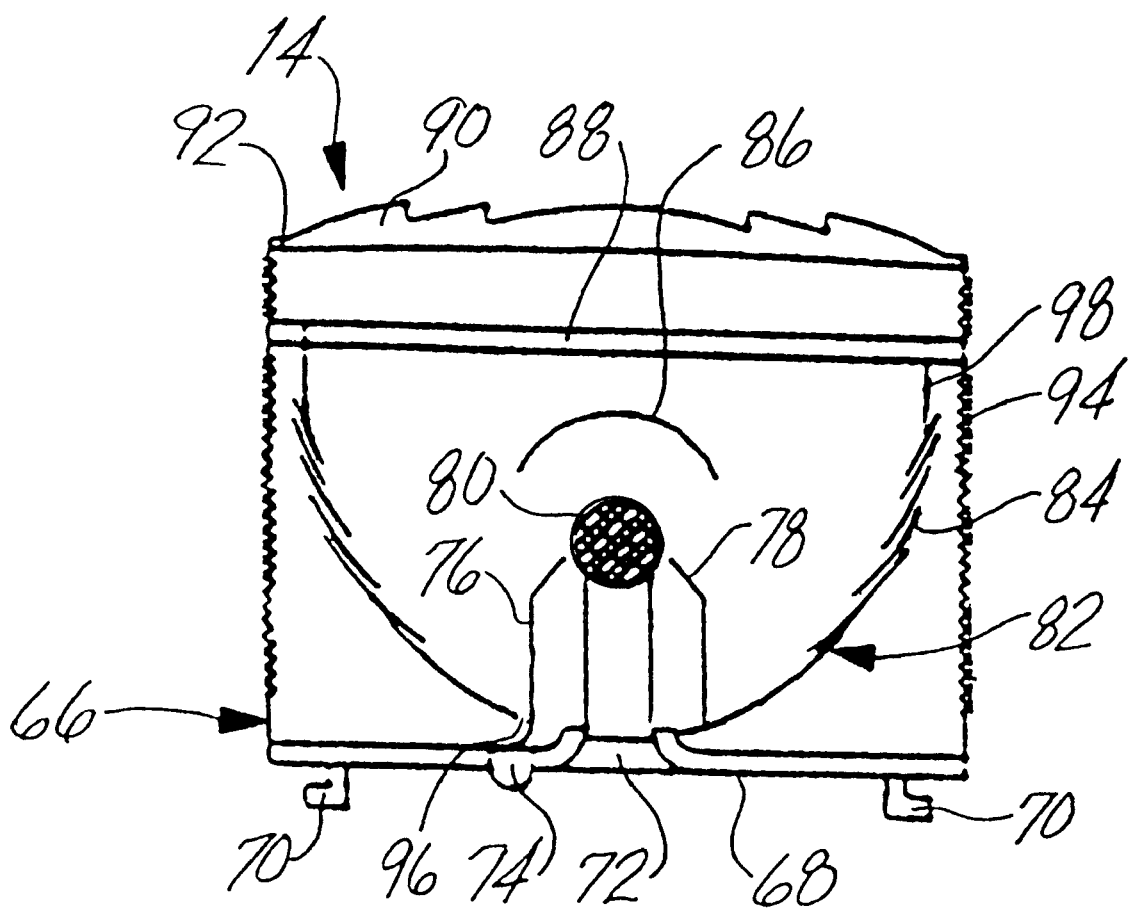
FIG. 3 is a schematic side cross-sectional view of a radiant head for the portable small light-weight radiant source of FIG. 1.

FIG. 3 illustrates the radiant head 14, constructed according to principles of this invention, for attachment with the air/fuel delivery device 12. The radiant head 14 includes a housing 64 that is preferably of the same configuration as the air/fuel delivery device housing 16 to contribute to the overall small packaging of the overall system. In a preferred embodiment, both the air/fuel delivery device housing 16 and the radiant head housing 64 have a cylindrical construction of approximately the same diameter. The housing 64 includes a first end 68 that is adapted for attaching with the partially-closed end 42 of the air/fuel delivery device housing 16. The first end 68 includes legs 70 as described above for cooperating with the openings 62 through the partially-closed end 42 and providing a releasible attachment therewith.

A fuel inlet opening 72 is disposed through the head first end 68 and is positioned to receive and end portion of the venturi outlet 44 and accept the combustible air/fuel mixture exiting therefrom. A conductor 74 is positioned along the head first end 68 and is positioned to receive electrical output from the piezoelectric element 46 in the partially-closed end 44. The conductor is well insulated from the head housing 66 and is attached to an ignition electrode 76 positioned within the head housing 66 that is also insulated from the housing 66 for igniting the combustible air/fuel mixture. A grounded ignition electrode 78 is also positioned within the head housing for providing the necessary ignition.

A luminous mantle 80 is positioned within the radiant head housing 66 at an end of a fuel path leading from the fuel inlet opening 72. The mantle can be formed from a suitable fibrous material that is known to emit radiation when thermally stimulated. Suitable mantle materials for use in this application are selected from the group of rare earth oxides. Mantles formed from this material are desirable because they are known to be the most efficient convertors of heat of gas combustion into luminous output. Such rare earth oxide materials include thorium oxide, cerium oxide, ytterbia, and combinations or blends thereof. Mantles formed from a blend of thorium oxide (99.3 percent by weight) and cerium oxide (0.7 percent by weight) are known in the art as Welsbach mantles that are used today in application such as camping lanterns and the like. However, the Welsbach mantle is known to be mechanically fragile due in part to flaws that are created during the filament synthesis process. Additionally, major constituent of the Welsbach mantel is thorium, which is known to be radioactive.

The Welsbach mantle mechanical strength can be improved by using a refined processing technique. The preferred processing technique comprises the steps of performing a carefully controlled pyrolysis where temperature ramps and temperature soaks are carefully controlled along with ambient has composition. The procedures are best conducted in a retort furnace where the objectives is to pyrolyze the cellulosic precursor at a slow and controlled rate, thereby minimizing the rifts and ruptures that are otherwise known to materialize as flows in the final products. A series of sintering steps at the completion of the pyrolysis step densities the ceramic for enhanced strength. Thoria mantles with dimensions similar to those expected for flashlight applications have been fabricated according to this process which survive 1,500 g (4 millisecond duration) impacts.

If radioactivity is a concern, alternative nonradioactive oxide ceramic materials are available, but luminous efficiency is compromised. Stability is another concern in that luminous output declines during operation for many trivalent elements. Yttria and most of the rare earth oxides exhibit this undesirable property. A suitable alternative for thoria in a light emitting has mantle is stabilized zirconia. Ceria is required as an optical modifier.

A preferred luminous mantle 80 is one formed from fibrous ytterbia. A suitable fibrous ytterbia mantle is one disclosed in U.S. Pat. No. 4,584,426, which is hereby incorporated by reference. A near stoichiometric premix of fuel and air is burned at the mantle and elevates the mantle to a temperature between 1800 and 2000 K, typically. Fibrous ytterbia emitters, when heated to high temperatures (about 2000 K), generate a substantial peak emission at 0.98 $\mu$m with a half width at half maximum of less than 150 nm. Small ytterbia emitters sized for use within the radiant head in such application have been made to survive impacts of 2,000 g's (4 milliseconds duration). Other rare earth oxides emit selectively at other wavelengths when heated. Erbia, holmia, and neodymia, for example, exhibit peak emissions at 1.55 $\mu$m, 2.0 $\mu$m, and 2.4 $\mu$m, respectively. If ytterbia is chosen as the emitter composition, the predominant radiant output is tailored to the requirements of cost-effective silicon CCD imagers. For covert surveillance, the small fringe amount of visible light emission can be filtered or trapped without compromising the near IR radiant output at 0.98 $\mu$m.

The luminous mantle 80 is positioned within the housing 66 at the focus of a reflecting parabola 82. The reflecting parabola 82 is made from suitable reflective material known in the art. The parabola serves to collimate approximately the light emitted from the mantle emitter into a beam. The parabola 82 includes one or more louvers 84 disposed along the parabola body to facilitate the passage of combustion exhaust products away from the mantle and the radiant head, as better described below. An optional reflector 86 can be positioned within the head housing 66 in front of the mantle 80 to capture light that is not intercepted by the parabola. The louvered parabola 82 and the optional reflector 86 play a significant role in thermal management.

An open top portion of the parabola 82 is covered with a planar, transparent lens 88 that is fabricated from a suitable transparent material. In an example embodiment, the transparent lens is fabricated from borosilicate or quartz glass and is mounted within the radiant head housing to minimize shock transfer therefrom. The material selected and the lens thickness will each vary depending on the particular radiant head application. When the radiant head is designed to generate radiation in the infrared wavelength range, the transparent lens 88 serves to prevent the combustion products from transferring directly their thermal energy to a front filter that is designed to block visible radiation but permit the passage of the desired IR radiation. In such application, suitable front filter materials include those commercially available under the product names Hoya type IR-80 or Schott type RG-850. A plastic film available from Polaroid under the product name XR84 is also effective.

An impact resistant, transparent 90 lens is position over a second end 92 of the radiant head housing 66. A suitable impact resistant lens 90 is one formed from polycarbonate. The impact resistant lens can be molded in the classic Fresnel form to aid in further collimation of the light emanating from the final front lens of the radiant head 14. The specific material selected, the lens thickness, the lens transparency and curvature will each vary depending on the particular radiant head application. As discussed above, if desired the impact resistant lens 90 can be replaced by a front filter to optimize the radiant emission within a desired wavelength range. In an example embodiment, the radiant head is designed to provide one candlepower of luminous output from the luminous mantle, which requires 12 watts of thermal energy from the fuel canister.

The impact resistant lens 90 is positioned across the radiant head housing second end 92 a distance axially away from the transparent lens 88. The radiant housing sidewall 94 extends axially between the first and second ends 68 and 90 and is formed from a perforated screen that acts as a flame arrester and is preferably formed from a metallic material having perforations no larger than about 1 mm in diameter. The portion of the housing sidewall 94 between the impact resistant lens 90 and the transparent lens 88 is also perforated to facilitate free convection. The perforations along, the housing sidewall 94 between both lenses can be louvered to also prevent the escape of radiation at the periphery.

For satisfactory radiant performance, the mantel requires a small amount of secondary combustion air and a restriction free path for the exhaust products. Essentially the same combustible air/fuel premix is supplied to the radiant head for combustion independent of the orientation of the radiant head when attached to the above-described air/fuel delivery device. The flow paths of the incoming secondary air and the exhaust product vary substantially as the device orientation changes. In fact, these flows interchange when the device orientation changes by 180 degrees. Accordingly, the radiant head housing 66 comprises a first port 96 at the base of the mantle 80 and a second port 98 at the periphery of the parabolic reflector 82 where the transparent lens 38 is located. These ports are interchangeable with respect to secondary combustion air and exhaust for the case where the mantle points up or down. The louvered parabola reflector 82 allows the escape of the exhaust gases and the entry of combustion air when the radiant system is oriented horizontally. This well ventilated system allows also for the introduction of outside air to mix with the exhaust gas to mitigate housing temperature rise.

The radiant head housing sidewall 94, as discussed above, is formed from a perforated screen to provide a flame arresting function should the radiant system be ignited or operated in the vicinity of a combustible gas leak or a flammable liquid spill. Additionally, the perforated screen also serves a secondary purpose as offering protection against inclement weather by attenuating the effects of wind and impeding the introduction of rain water into the operating or dormant system.

Figure 4B:
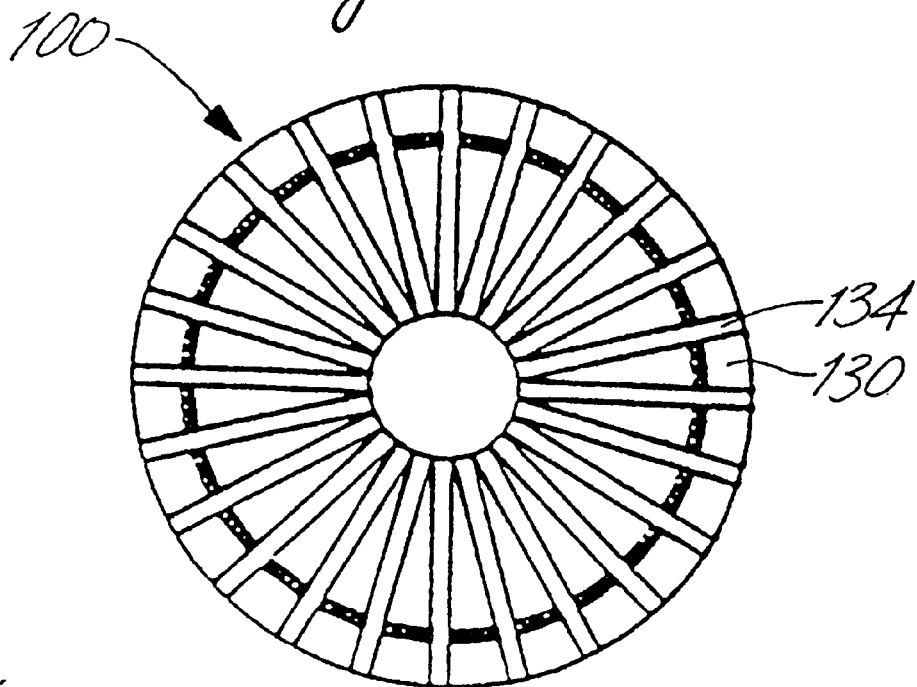
FIGS. 4A and 4B are respectively a schematic side cross-sectional view, and a schematic end view, of a thermophotovoltaic head for use with an air/fuel delivery system to form a portable small, light-weight electrical power generating source according to principles of this invention.
Figure 4A:
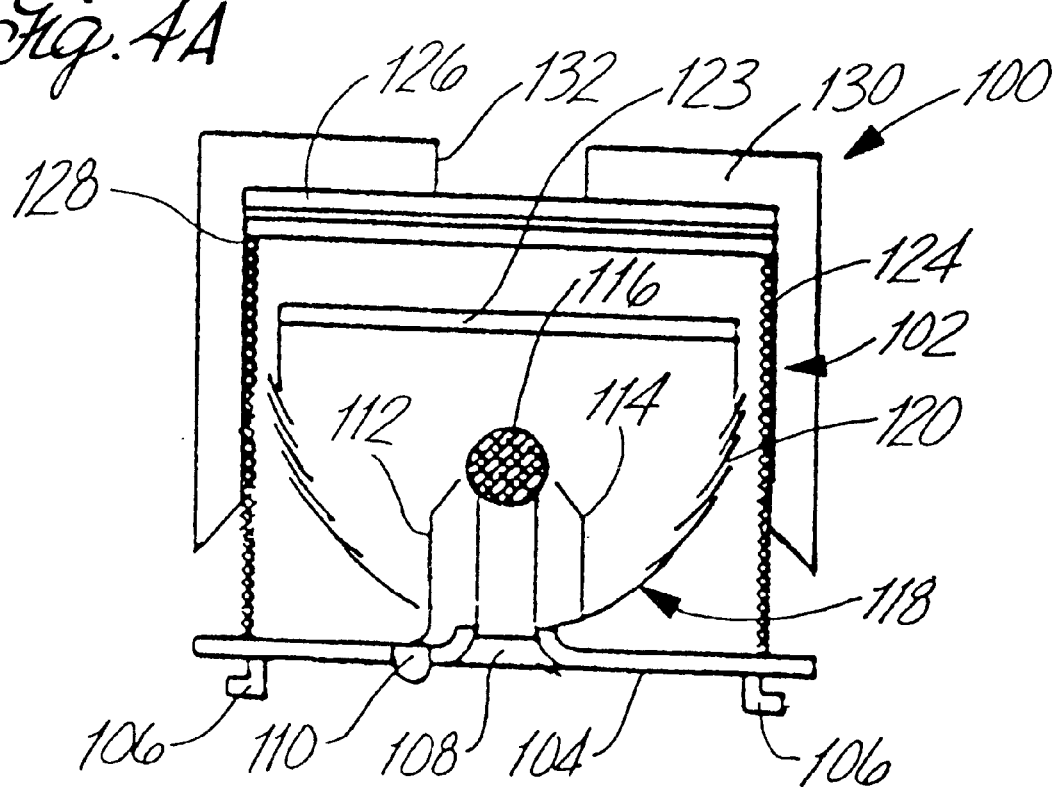

FIGS. 4A and 4B each illustrate a thermophotovoltaic (TPV) head 100, constructed according to principles of this invention, for attachment with the above-described air/fuel delivery device to produce electrical power. Like the radiant head, the TPV head 100 includes a housing 102 having a first end 104 with legs 106 adapted to provide a releasible attachment with the partially-closed end 42 of the air/fuel delivery device 12. The housing first end 104 includes a venturi inlet opening 108 and a conductor 110 is positioned therein. The conductor 110 is well insulated from the TPV head housing 100 and is attached to an ignition electrode 112 positioned within the head housing 100 that is also insulated from the housing for igniting the combustible air/fuel mixture. A grounded ignition electrode 114 is also positioned within the head housing 100 for providing the necessary ignition.

A luminous mantle 114 is constructed from the same materials described above for the radiant head and is positioned within the TPV housing 100 at the focus of a reflecting parabola 118. The reflecting parabola can be formed from suitable reflecting materials and comprises one or more louvers 120 for the same reasons noted above, e.g., to provide convective cooling by permitting the passage of combustion exhaust products away from the mantle and providing secondary combustion air to the mantle. The TPV housing sidewall 124 is formed from perforated screen to facilitate the passage of exhaust products from the parabola 120 and the passage of secondary combustion air to the mantle 122. The passage of secondary combustion air to the mantle 122 also serves to convectively cool the parabola. The objective of the thermal design is to provide a safe product with an acceptable case temperature over the operating temperature range. Configured in this manner, the TPV housing will permit the free flow pattern of exhaust gas and secondary combustion air independent of the TPV housing's orientation.

A transparent lens 123 formed from the glass materials noted above is positioned across the periphery of the parabola opening. The lens 123 can be coated with a particular material for purposes of reducing the long wavelength thermal load on a photovoltaic cell or array of cells. In an example embodiment, the lens can be coated with indium tin oxide to achieve this purpose.

One or more photovoltaic cells 126 are positioned across a second TPV housing end 128. In an example embodiment the photovoltaic cells are formed from silicon and more than one such photovoltaic cell is used to form an array. The exact size, location, and interconnection of the silicon photovoltaic cells used to form the array is a function of the particular application and the desired output voltage from the cell array. In an example embodiment, the TPV head is designed to produce 2 to 3 watts of electrical power based on a one candlepower luminous output from the luminous mantle and 12 watts of thermal energy from the fuel canister.

An end cap 130 is attached over the photovoltaic cells 126 and the TPV housing second end 128. The end cap 130 is in the form of a free convention heat sink and comprises a centrally-positioned opening 132 therethrough. As shown in FIG. 4B, end cap 130 includes a number of heat sink fins 134 to facilitate convective cooling of the TPV head 100. The end cap 130 is attached to the photovoltaic cells 126 by conventional method, and the end cap material is determined based on the particular cooling need and TPV head application. If desired, a recuperator can be used in conjunction with the TPV head 100 to transfer some of the enthalpy in the exhaust gas stream to the incoming combustion air for enhanced efficiency.

Figure 6:
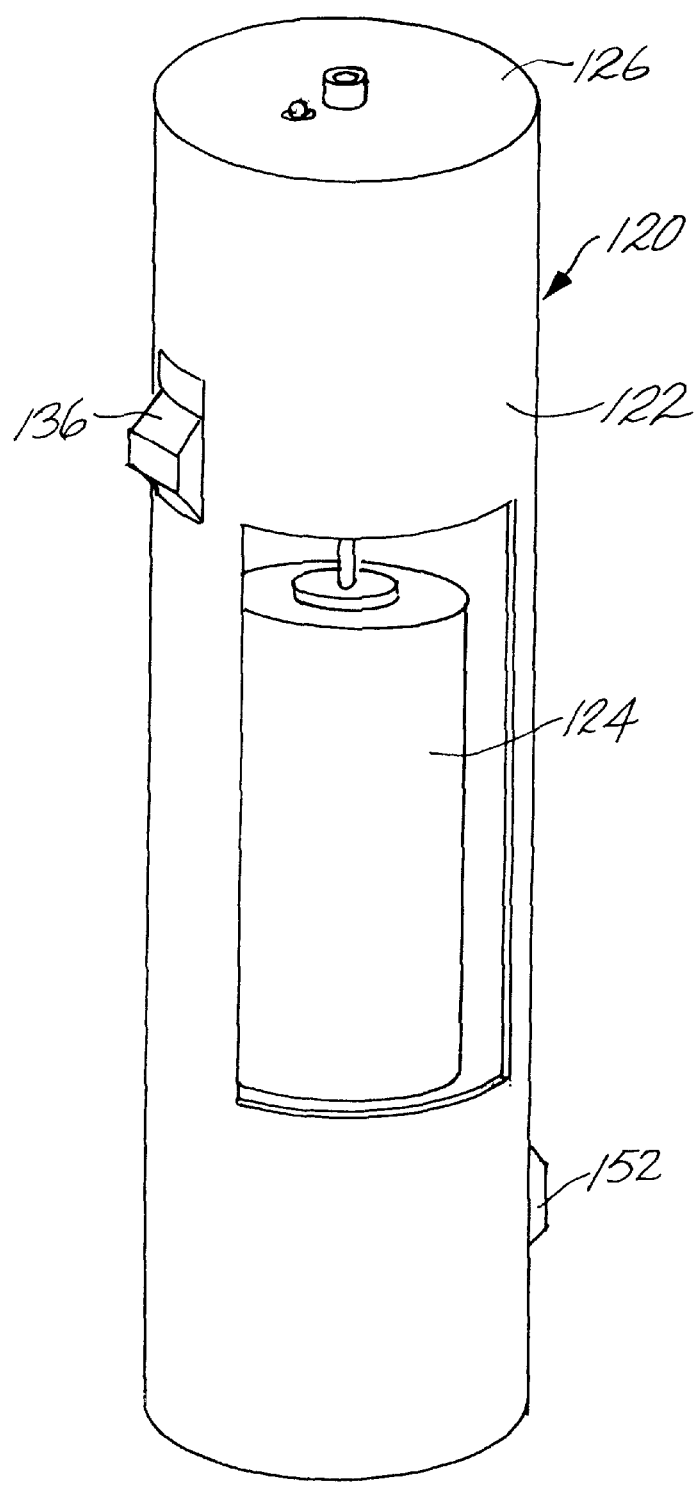
FIG. 6 is a schematic perspective end view of the dual air/fuel delivery system of FIG. 5.

FIGS. 5 and 6 illustrate an alternative air/fuel delivery device embodiment 120, constructed according to principles of this invention, comprising a dual air/fuel delivery system. Specifically, the dual air/fuel delivery device 120 includes a housing 122 that is designed to both accommodate placement of a fuel canister 124 therein and dispense fuel from opposite housing ends 126 and 128. The fuel canister 124 is the same as that previously described above for the single air fuel delivery device. The housing 122 includes a first fuel dispensing assembly 130 comprising the fuel delivery on/off switch 132 and pressure regulator 134 as described above, which is activated by and connected to the housing on/off switch 136 via the pivoting lever 138 also as described above. Downstream from the pressure regulator 134, the first fuel dispensing assembly 130 is identical to that described above for the single air/fuel delivery device.

The dual air/fuel delivery device 120 comprises a fuel distributor 140 that is attached to the tube member 142 extending from the fuel canister and upstream of the fuel delivery on/off switch 132. The fuel distributor 140 serves to route fuel from the fuel canister 124 via suitable fuel line 144 to a second fuel dispensing assembly 146 located within the housing adjacent the housing second end 128. The second fuel dispensing assembly 146 is identical in all respects to the first fuel dispensing assembly 130, comprising the same type of fuel delivery on/off switch 148, pressure regulator 150, housing on/off switch 152 and on/off switch activating/connecting lever 154. The second fuel dispensing assembly 146 is designed to be operated independently of the first fuel dispensing assembly 130 by activation of the second housing on/off switch 152. This is possible because the fuel distributor 140 provides fuel to either the first or second fuel dispensing assembly, depending on which housing on/off switch is activated.

Each first and second fuel dispensing assembly includes an adjustable valve or adjustable orifice, a stem projecting therefrom, and a venturi as described earlier for the single air/fuel delivery system. Additionally, the dual air/fuel delivery device 120 includes the same ignitor means 156 previously described for the single air/fuel delivery device that is positioned at each end 126 and 128 of the housing 122. The housing first and second ends 126 and 128 are each designed in the same manner as described above for the single air/fuel delivery device to accommodate attachment with either a radiant or TPV head.

The dual air/fuel delivery device 120 is designed to accommodate attachment and operation of two heads, i.e., the radiant head and/or the TPV head as previously described. The device 120 can be used to operate independent radiant heads, independent TPV heads, or a combination of a radiant and TPV head. In an example embodiment, the dual air/fuel delivery device is fitted with a radiant head on one and a TPV device on an opposite end to provide both illumination and electrical power generating functions, to function as both a flashlight and a power generator. In an example embodiment, the combination flashlight power generator is designed to both generate one candlepower of luminous output from the radiant head and 2 to 3 watts of electrical power from the TPV head based on 12 watts of thermal energy provided to from the fuel canister.

It is to be understood that the output from the radiant head and TPV head when attached to both the single and dual air/fuel delivery devices of the invention can and will vary depending on the particular application and materials of construction that are selected, e.g., the type of fuel source, mantle material, mantle size, and mantle construction and the like. Additionally, depending on the particular application, the radiant and/or electrical power generating source of this invention can be scaled up or down for particular applications. For example, radiant and/or electrical power generating sources of this invention can be scaled up to provide a higher level of either or both illumination and/or electrical power generation, in which can it may be increase the conductive and/or convective cooling capacity of the system. As an example, in such application it may be desired to add one or more fans and the like to the design to provide any additional convective cooling.

After a desired radiant and/or TPV head is attached to either the single or dual air/fuel delivery device, the assembled unit is operated in the following manner. The housing on/off switch is moved axially to the "on" position, i.e., in a direction towards the adjacent radiant or TPV head, which causes the fuel delivery on/off switch and check valve to open and dispense fuel from the fuel canister to the pressure regulator, through the stem and adjustable valve or orifice and into the venturi. The ignitor means is also activated by the movement of the switch to the "on" position, generating in electrical spark that is sent to the ignition electrodes adjacent the mantle. The combustion air/fuel mixture delivered to the mantle is ignited and the desired illumination or electrical power generation is initiated. The timing of the ignition relative to the delivery of the combustible air/fuel mixture is such that first time reliable ignition is insured. The device is shut off by sliding the housing on/off switch to the "off" position, i.e., in an opposite direction away from the adjacent radiant or TPV head, causing the ignitor means to reset for the next use and fuel delivery from the fuel canister to terminate. Constructed in this manner the radiant and/or electrical power generating source of this invention is operated by a single-step ignition process, which is similar to a conventional flashlight and thus easy to use.

Although, limited embodiments of portable small light-weight radiant and/or electrical power generating sources have been described and illustrated herein, many modifications and variations will be apparent to those skilled in the art. Accordingly, it is to be understood that within the scope of the appended claims, that portable small light-weight radiant and/or electrical power generating sources constructed according to principles of this invention may be embodied other than as specifically described herein.

What is claimed is:

1. A portable radiating source comprising:
   a fibrous refractory emitter;
   a reflector and lens system;
   a air/fuel delivery system;
   a combination fuel valve and piezoelectric ignitor for an automatic ignition sequence and turn-off; and
   an onboard fuel canister.

2. The radiating source of claim 1 where the fibrous refractory emitter is formed from a rare earth oxide material.

3. The radiating source of claim 2 where the fibrous refractory emitter is selected from the group of materials consisting of ytterbia, erbia, holmia, neodymia alloyed with trace amounts of europia and/or holmia, and mixtures thereof.

4. The radiating source of claim 1 where the fibrous refractory emitter is selected from the group of materials consisting of thoria-ceria, zirconia-ceria, yttria-ceria, and mixtures thereof.

5. The radiating source of claim 2 where the reflector and lens system produces radiation in the 400 to 720 nm wavelength band and transmits IR radiation.

6. The radiating source of claim 4 where all the lens is transparent to radiation in the 400 to 720 nm wavelength band.

7. The radiating source of claim 1 further comprising a flame arrester disposed around the fibrous refractory emitter.

8. The radiating source of claim 1 wherein the air/fuel delivery system includes a check valve and a pressure regulator, wherein the check valve is interposed between the fuel canister and the pressure regulator.

9. An portable air/fuel delivery system comprising:
   a housing having a hollow cavity therein;
   a fuel canister disposed within the cavity and adapted to retain a volume of hydrocarbon fuel therein;
   a check valve disposed within the fuel canister;
   means for activating the check valve disposed within the cavity;
   a pressure regulator disposed within the cavity downstream of the fuel canister; and
   a venturi disposed within the cavity down stream of the pressure regulator.

10. The delivery system as recited in claim 9 further comprising an ignition means disposed within the cavity that is connected to the activating means to ignite hydrocarbon fuel exiting the venturi upon activation of the check valve.

11. The delivery system as recited in claim 9 further comprising a radiant source attached thereto, wherein the radiant source comprises:
   a radiant source housing adapted for attachment to an end of the delivery housing;
   a fibrous mantle disposed within the radiant source housing:
   a reflector and lens system disposed within the radiant source housing; and
   means for passing exhaust gas and secondary combustion air through the radiant source housing.

12. The delivery system as recited in claim 9 further comprising an electrical power generating source attached thereto comprising:
   a electrical power generating source housing adapted for attachment to an end of the delivery housing;
   a fibrous mantle disposed within the electrical power generating source housing:
   a reflector and lens system disposed within the electrical power generating source housing; means for passing exhaust gas and secondary combustion air through the radiant source housing; and
   at least on photovoltaic cell disposed within the electrical power generating source housing.

13. The delivery system as recited in claims 11 or 12 wherein the fibrous mantle is formed from a rare earth oxide.

14. The delivery system as recited in claim 13 wherein the rare earth oxide is selected from the group consisting of ytterbia, erbia, holmia, thorium oxide, cerium oxide, neodymia, europia, and mixtures thereof.

15. The delivery system as recited in claim 12 further comprising a radiant source attached thereto, wherein the radiant source comprises:
   a radiant source housing adapted for attachment to an end of the delivery housing opposite from the electrical power generating source housing;
   a fibrous mantle disposed within the radiant source housing:
   a reflector and lens system disposed within the radiant source housing; and
   means for passing exhaust gas and secondary combustion air through the radiant source housing.

16. A portable radiant source comprising:
   at least one air/fuel delivery device comprising:
      an air/fuel delivery device housing;
      a fuel canister disposed within the housing adapted to contain a volume of combustible hydrocarbon fuel therein;
      means for removing hydrocarbon fuel from the canister disposed within the housing;
      a pressure regulator positioned downstream from the removing means and disposed within the housing; and
      a venturi position downstream from the pressure regulator and disposed within the housing; and
   a radiant head attached to an end of the air/fuel delivery device housing and comprising:
      a radiant head housing;
      a fibrous mantle disposed within the radiant head housing, the mantle being in gas flow communication with the venturi;
      a reflector and lens system disposed within the radiant head housing adjacent the mantle; and
      means for passing exhaust gas and secondary combustion air through the radiant head housing;
   wherein the air/fuel delivery device further comprises an ignition means disposed within the delivery device housing that is connected to the removing means to ignite hydrocarbon fuel routed to the mantle.

17. The radiant source as recited in claim 16 wherein the fibrous mantle is formed from a rare earth oxides.

18. The radiant source as recited in claim 17 wherein the rare earth oxide is selected from the group consisting of ytterbia, erbia, holmia, thorium oxide, cerium oxide, neodymia, europia, and mixtures thereof.

19. The radiant source as recited in claim 16 further comprising:

an electrical power generating head attached to an end of the air/fuel delivery device opposite from the radiant head, the electrical power generating head comprising:
   a electrical power generating head housing;
   a fibrous mantle disposed within the electrical power generating head housing;
   a reflector and lens system disposed within the electrical power generating head housing; adjacent the fibrous mantle;
   means for passing exhaust gas and secondary combustion air through the radiant source housing; and
   at least on photovoltaic cell disposed within the electrical power generating source housing;
wherein the radiant source includes two air/fuel delivery devices, one used to power the radiant head and one used to power the electrical power generating head.

20. A electrical power generating source comprising:
   at least one air/fuel delivery device comprising:
      an air/fuel delivery device housing;
      a fuel canister disposed within the housing adapted to contain a volume of combustible hydrocarbon fuel therein;
      means for removing hydrocarbon fuel from the canister disposed within the housing;
      a pressure regulator positioned downstream from the removing means and disposed within the housing; and
      a venturi position downstream from the pressure regulator and disposed within the housing; and
   an electrical power generating head attached to an end of the air/fuel delivery device housing and comprising:
      an electrical power generating head housing;
      a fibrous mantle disposed within the electrical power generating head housing, the mantle being in gas flow communication with the venturi;
      a reflector and lens system disposed within the electrical power generating head housing adjacent the mantle;
      means for passing exhaust gas and secondary combustion air through the electrical power generating head housing; and
      at least one photovoltaic cell disposed within the electrical power generating head housing adjacent the reflector and lens system;
   wherein the air/fuel delivery device further comprises an ignition means disposed within the delivery device housing that is connected to the removing means to ignite hydrocarbon fuel routed to the mantle.

21. A portable combination electrical power generating/radiant source comprising:
   an air/fuel delivery device comprising:
      an air/fuel delivery device housing;
      a fuel canister disposed within the housing adapted to contain a volume of combustible hydrocarbon fuel therein;
      first and second means for removing hydrocarbon fuel from the canister disposed within the housing;
      first and second pressure regulators positioned downstream from a respective removing means and disposed within the housing; and
      first and second venturis position downstream from a respective pressure regulators and disposed within the housing; and
   an electrical power generating head attached to a first end of the air/fuel delivery device housing adjacent the first venturi and comprising:

an electrical power generating head housing;

a fibrous mantle disposed within the electrical power generating head housing, the mantle being in gas flow communication with the first venturi;

a reflector and lens system disposed within the electrical power generating head housing adjacent the mantle;

means for passing exhaust gas and secondary combustion air through the electrical power generating head housing; and at least one photovoltaic cell disposed within the electrical power generating head housing adjacent the reflector and lens system;

a radiant head attached to an end of the air/fuel delivery device housing and comprising:

a radiant head housing;

a fibrous mantle disposed within the radiant head housing, the mantle being in gas flow communication with the second venturi:

a reflector and lens system disposed within the radiant head housing adjacent the mantle; and means for passing exhaust gas and secondary combustion air through the radiant head housing;

wherein the air/fuel delivery device further comprises independent first and second ignition means disposed within the delivery device housing that is connected to a respective removing means to ignite hydrocarbon fuel routed to each mantle.

\* \* \* \* \*